(12) United States Patent
Stack

(10) Patent No.: US 6,902,434 B2
(45) Date of Patent: Jun. 7, 2005

(54) BATTERY FUSE BUS BAR ASSEMBLY

(75) Inventor: Thomas James Stack, Chicago, IL (US)

(73) Assignee: Cooper Technologies Company, Houston, TX (US)

( * ) Notice: Subject to any disclaimer, the term of this patent is extended or adjusted under 35 U.S.C. 154(b) by 426 days.

(21) Appl. No.: 10/201,815

(22) Filed: Jul. 23, 2002

(65) Prior Publication Data
US 2004/0018417 A1 Jan. 29, 2004

(51) Int. Cl.[7] ............................................. H01R 13/68
(52) U.S. Cl. ...................... 439/621; 439/766; 337/189; 337/188; 337/187
(58) Field of Search .................... 337/158, 159, 337/161, 188, 189, 187, 229, 256, 290; 439/620, 621, 522, 766, 765, 76.2; 174/50, 58, 59; 429/178, 65

(56) References Cited

U.S. PATENT DOCUMENTS

| | | | | |
|---|---|---|---|---|
| 4,747,793 A | * | 5/1988 | Fukuda et al. | 439/766 |
| 5,486,434 A | * | 1/1996 | Aoyama | 429/178 |
| 5,643,693 A | * | 7/1997 | Hill et al. | 429/121 |
| 5,645,448 A | * | 7/1997 | Hill | 439/522 |
| 6,222,439 B1 | * | 4/2001 | Tanigawa et al. | 337/401 |
| 6,294,978 B1 | * | 9/2001 | Endo et al. | 337/166 |
| 6,396,380 B1 | * | 5/2002 | Girke et al. | 337/189 |
| 6,509,824 B2 | * | 1/2003 | Inaba et al. | 337/295 |
| 6,512,443 B1 | * | 1/2003 | Matsumura et al. | 337/189 |
| 6,723,920 B2 | * | 4/2004 | Higuchi et al. | 174/50 |
| 6,759,938 B2 | * | 7/2004 | Matsumura et al. | 337/161 |

\* cited by examiner

*Primary Examiner*—Gary Paumen
(74) *Attorney, Agent, or Firm*—Armstrong Teasdale LLP (57) ABSTRACT

A battery fuse assembly for a storage battery having a threaded post terminal is provided. The fuse assembly includes a bus bar having a planar surface and a first opening extending therethrough, at least one threaded terminal stud extending from the planar surface and distanced from the first opening, and a battery fuse coupled to the first surface over the second threaded post terminal.

20 Claims, 6 Drawing Sheets

BATTERY FUSE BUS BAR ASSEMBLY

BACKGROUND OF THE INVENTION

This invention relates generally to fuse assemblies, and more particularly, to fuse assemblies for storage batteries.

Fuses are widely used as overcurrent protection devices to prevent costly damage to electrical circuits. Fuse terminations typically form an electrical connection between an electrical power source and an electrical component or a combination of components arranged in an electrical circuit. One or more fusible links or elements, or a fuse element assembly, is connected between the fuse terminations so that when electrical current through the fuse exceeds a predetermined limit, the fusible elements melt and open one or more circuits through the fuse to prevent electrical component damage.

Modern vehicles include a variety of auxiliary circuits for which fuse protection is advisable. Storage batteries used in passenger vehicles typically include tapered post terminal connections, and a battery post clamp is sometimes coupled to the positive terminal post of the battery. For this battery style, a fuse capable battery clamp may be employed incorporating a threaded terminal stud extending from the clamp to provide a site for a battery fuse, and auxiliary power supply cables are electrically coupled to the terminal stud in electrical connection with the fuse. Special insulator nuts are used to isolate the clamp terminal stud and prevent accidental bypassing of the fuse. As such, auxiliary circuit fuse protection may be provided in the immediate vicinity of the storage battery. Unfortunately, these known battery post clamps to facilitate fuse protection at the storage battery are limited in application scope to batteries that employ the tapered post terminal design.

For example, at least in the North American market, storage batteries for trucks, buses and specialty vehicles typically include threaded posts for electrical connections to vehicle electrical components and circuits. A heavy power cable is typically connected to a positive threaded post terminal of the battery for connection to an electrical starter motor, and jumper feed cables are also connected to the threaded post terminal for power supply to auxiliary circuits and non-starter circuit components. The jumper feed cables and respective circuits must then be individually protected with a fuse or fuse arrangement. Moreover, it can be difficult to make several connections to the positive threaded post terminal and route the jumper feed cables properly in a small amount of space.

In some instances, only the heavy power cable is connected to the positive threaded post terminal of the storage battery. The power cable supplies power to a starter motor, which provides a termination point for connection to auxiliary circuits, and non-starter circuit components. Thus, jumper feed cables for auxiliary circuits are connected to the starter motor rather than to the storage battery. The jumper feed cables, however, still must be individually protected with fuses, and the location of the starter motor in a restricted space sometimes makes auxiliary power connections difficult. Additionally, auxiliary power connections to the starter motor can be problematic when servicing and maintaining the starter motor and/or auxiliary electrical systems.

BRIEF DESCRIPTION OF THE INVENTION

In one aspect, a battery fuse assembly for a storage battery having a threaded post terminal is provided. The fuse assembly comprises a bus bar comprising a planar surface and a first opening extending therethrough, at least one threaded terminal stud extending from said planar surface and distanced from said first opening, and a battery fuse coupled to said first surface over said second threaded post terminal.

In another aspect, a battery fuse assembly for a storage battery having a threaded post terminal is provided. The fuse assembly comprises a bus bar comprising an end edge and a first surface extending from said end edge. The first surface comprises an opening therethrough, and the opening is distanced from said end edge. The opening is dimensioned for receiving the first threaded post terminal of the battery, and at least one threaded terminal stud extends from said first surface at a distance from said first opening. A battery fuse engaged to said first surface over said threaded terminal stud.

In another aspect, a battery fuse assembly is provided. The assembly comprises a battery comprising a threaded terminal post, and a bus bar comprising a first opening and a second opening therethrough. The threaded terminal post extends through said first opening, and at least one threaded terminal stud extends through said second opening of said bus bar. A battery fuse is engaged to said bus bar over said threaded terminal stud.

In still another aspect, a battery fuse assembly is provided. The assembly includes a battery comprising a threaded terminal post and a starter cable in electrical connection with said terminal post. A conductive bus bar includes a first opening and a second opening therethrough and the threaded terminal post extends through said first opening, and a nut in threaded engagement with said battery terminal post couples said bus bar and said starter cable to said battery terminal post. A threaded terminal stud extends from said bus bar through said second opening, and a battery fuse comprising opposite bearing surfaces and an opening therebetween is positioned over the terminal stud so that the stud extends through the opening in the fuse. One of the fuse bearing surfaces contacts the bus bar, and an auxiliary power supply cable contacts the other of the bearing surfaces of the fuse. An inulsative spacer element is configured to isolate the auxiliary power supply cable and the fuse from the threaded terminal stud, and a flange nut is coupled to the threaded terminal stud with threaded engagement such that the flange nut contacts said spacer element.

DETAILED DESCRIPTION OF THE INVENTION

Figure 1:
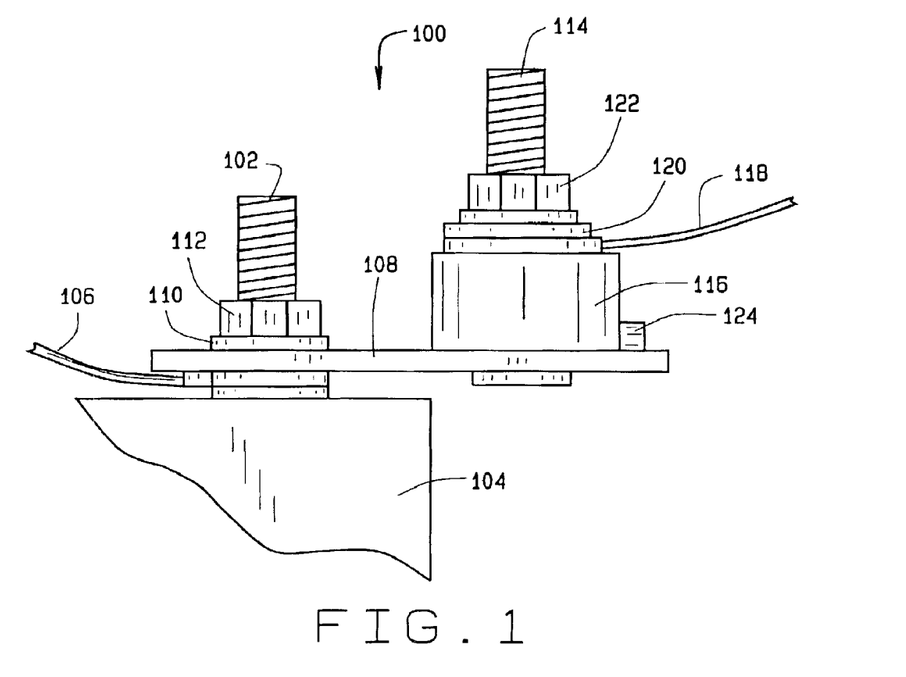
FIG. 1 is an elevational view of a battery fuse bus bar assembly.

FIG. 1 is an elevational view of an exemplary embodiment of a battery fuse bus bar assembly 100 coupled to a positive terminal 102 of an exemplary vehicle storage battery 104 commonly used in the North American truck, bus, and specialty vehicle market. Accordingly, terminal 102 is a threaded post terminal in the illustrated embodiment. Such a battery 104 is known and commercially available from a variety of manufacturers, and as the construction and operation of battery 104 is readily appreciated by those in the art, further discussion thereof is omitted. While described and illustrated in the context of threaded post storage battery 104 for a truck, bus, or specialty vehicle, it is appreciated that the benefits of assembly 100 are equally applicable in other contexts and applications. Consequently, the exemplary description of the present invention and operating environment is set forth for illustrative purposes only.

Assembly 100 includes a starter cable 106 coupled to positive battery terminal 102 for supplying electrical power from battery 104 to a vehicle starter motor (not shown). A conductive bus bar 108 is also coupled to positive battery terminal 102, and bus bar 108 and starter cable 106 are securely fastened to battery terminal 102 and to one another with a known fastener, such as washer 110 and nut 112 with threaded engagement.

Bus bar 108 extends from positive battery terminal 102 and in an exemplary embodiment includes a threaded terminal stud 114 attached thereto. Stud 114 provides for attachment of a known battery fuse 116 for supplying fuse protection to an auxiliary power supply cable 118 electrically connected to battery fuse 116. An insulative spacer element 120 electrically isolates battery fuse 116 and auxiliary power supply cable 118 from bus bar terminal stud 114, thereby preventing current flow from terminal stud 114 to auxiliary power supply cable 118 that would otherwise circumvent battery fuse 116. A flange nut 122 is coupled to terminal stud 114 and maintains spacer element 120, auxiliary power cable 118 and battery fuse 116 in proper position despite engine vibration and vehicle vibration for both internal and external influences as the vehicle is used. Further, bus bar 108 includes an anti-rotation stop 124 projecting upwardly from a surface of bus bar 108 to prevent movement of fuse 116 relative to bus bar 108.

Fuse 116 in an illustrative embodiment is a rectangular or cubical-shaped fuse having a fusible link or fusible element therein that is constructed to melt, disintegrate, fail or otherwise open to break an electrical circuit through fuse 116. In normal operation, power drawn from battery 104 flows through bus bar 108 and through fuse 116 to auxiliary power cable 118 to auxiliary circuits or components. However, when current flow through fuse 116, or more specifically current flow through the fusible link or fusible element internal to fuse 116, approaches a predetermined level the fusible link or element opens the circuit through fuse 116 and prevents damaging current flow to the auxiliary circuits or components connected to auxiliary power supply cable 118.

In an exemplary embodiment, battery fuse 116 is a known FS-HVBF series 58V rated battery fuse available from Cooper Bussmann—Automotive Products of Chicago, Ill. In an alternative embodiment, battery fuse 116 is a known CF-58V fuse available from Wickmann USA of Atlanta, Ga. and internationally from the manufacturing division Wilhelm Pudenz GmbH of Dunsen, Germany. Still other fuses may be used in alternative embodiments without departing from the scope of the present invention.

Assembly 100, through bus bar 108, provides a compact and localized connection to threaded post terminal 102 of battery 104 and a master fuse arrangement for auxiliary circuits and components. In an exemplary embodiment, fuse protection is provided for amperages of about 50A to about 300A.

Figure 2:
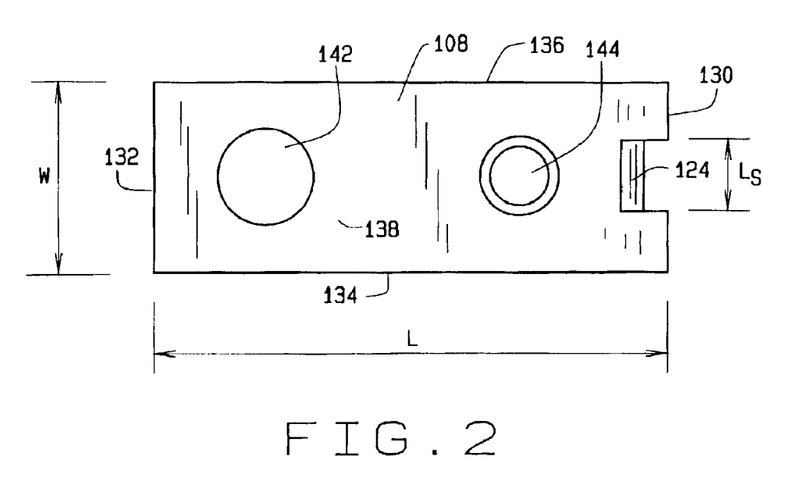
FIG. 2 is a top plan view of the bus bar shown in FIG. 1.
Figure 3:
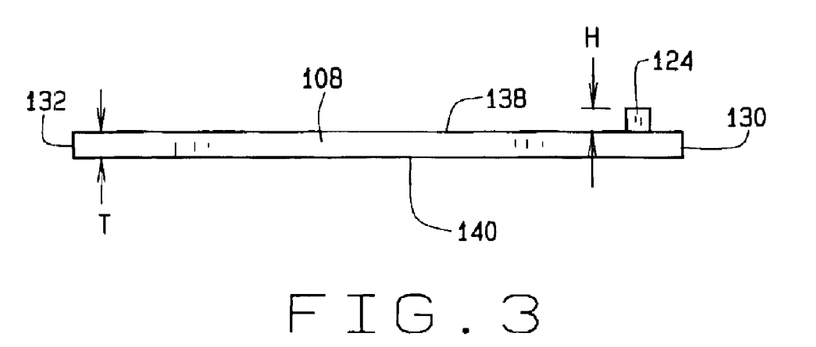
FIG. 3 is a side elavational view of the bus bar shown in FIG. 2.

FIGS. 2 and 3 are a top plan and side elevational view, respectively, of bus bar 108. Bus bar 108 is fabricated from a conductive material, such as copper, according to known methods and techniques, including but not limited to stamping and die casting operations. In a further embodiment, bus bar 108 is plated with tin or another known material to resist or retard corrosion of bus bar 108.

Bus bar 108 is formed into a generally rectangular plate in an exemplary embodiment and includes opposite end edges 130, 132, elongated lateral edges 134, 136 extending between end edges 130, 132, and generally flat or planar surfaces 138, 140 extending opposite of and substantially parallel to one another and between edges 130, 132, 134, and 136. In one embodiment, bus bar 108 has a length L of about 56 mm, a width W of about 20.0 mm, and a thickness T of about 2.36 mm, although it is appreciated that greater or lesser dimensions for L, T and W may be employed in alternative embodiments. It is further appreciated that bus bar 108 may be formed into a variety of shapes in lieu of the above-described rectangular plate.

A battery terminal bore 142 extends through bus bar 108 at a distance from bus bar edge 132 and is substantially centered between bus bar lateral edges 134, 136 on one end of bus bar 108. Battery terminal bore 142 is dimensioned for insertion over battery threaded post terminal 102 (shown in FIG. 1). A fuse terminal bore 144 extends through bus bar 108 and is substantially centered between bus bar lateral edges 134, 136 on an end of bus bar 108 opposite of battery terminal bore 142. Fuse terminal bore 144 is dimensioned to receive terminal stud 114 (shown in FIG. 1) with an interference fit. In a particular embodiment, battery terminal bore 142 has an inner diameter of about 10.3 mm, fuse terminal bore 144 has an inner diameter of about 8.0 mm, and bores 142, 144 are located from one another at a center-to-center distance of about 28.0 mm. It is appreciated, however that greater or lesser diameter values for bores 142, 144 may be employed in alternative embodiments, and further that relative spacing of bores 142, 144 may be varied in alternative embodiments.

Anti-rotation stop 124 projects from bus bar surface 138 between fuse terminal bore 144 and bus bar end edge 130 to maintain fuse 116 (shown in FIG. 1) in proper position relative to bus bar 108. In one embodiment, anti-rotation stop 124 is cut or sheared from bus bar end edge 130 and is bent upwardly at approximately a 90° angle with respect to bus bar surface 138. As such anti-rotation stop 124 projects upwardly from surface 138 for a distance H of about 2.36 mm and extends for a length LS of about 8.0 mm measured in a direction substantially parallel to bus bar end edge 130. It is appreciated, however that greater or lesser dimensions for anti-rotation stop 124 may be employed in alternative embodiments. It is further appreciated that stop 124 may be located elsewhere on bus bar, such as at a location between bores 142, 144 while serving the same purpose of preventing relative movement of bus bar 108 and fuse 116 in use.

Figure 4:
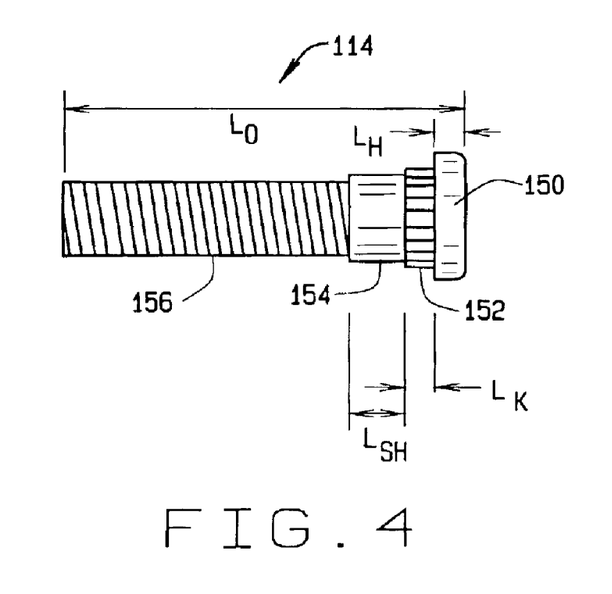
FIG. 4 is an elevational view of a terminal stud for the assembly shown in FIG. 1.

FIG. 4 is an elevational view of terminal stud 114 for attaching fuse 116 (shown in FIG. 1) to bus bar 108 (shown in FIGS. 1–3). As illustrated in FIG. 4, terminal stud 114 includes a head portion 150, a coarse knurl 152 extending from head portion 150, a shoulder 154 extending from coarse knurl 152, and a threaded stud portion 156 extending from shoulder 154. Threaded stud portion 156 in an illustrative embodiment includes a ¼–20 UNC thread, and terminal 114 is fabricated from stainless steel according to known techniques, including machining operations and cold-headed operations to form shoulder 154.

In an exemplary embodiment, terminal stud 114 has an overall length $L_O$ of about 38.0 mm, head portion 150 extends for a length $L_H$ of about 3.0 mm, coarse knurl 152 extends for a length $L_K$ of about 2.4 mm, and shoulder 154 extends for a length $L_{SH}$ of approximately 2.4 mm. In a further embodiment, head portion 150 has an outer diameter of about 12.0 mm, coarse knurl 152 has an outer diameter of about 8.8 mm, and shoulder 154 has an outer diameter of approximately 7.8 mm. It is appreciated, however, that other dimensions, both greater and lesser than those set forth above, may be employed in alternative embodiments to fabricate terminal 114.

Comparing the exemplary dimensions of bus bar 108 (shown in FIGS. 2 and 3) with the exemplary dimensions of terminal 114, it may be seen that terminal shoulder 154 is dimensioned slightly less than bus bar fuse terminal bore 144 (shown in FIG. 2), while terminal coarse knurl 152 is dimensioned slightly greater than fuse terminal bore 144. As such, terminal shoulder 154 may be received in fuse terminal bore 144 to properly position terminal 114 with respect to bore 144, while terminal coarse knurl 152 creates an interference fit with fuse terminal bore 144 to securely couple terminal 144 to bus bar 108.

It is contemplated that other known and commercially available stud terminals may likewise be employed in alternative embodiments of the invention in lieu of the above-described terminal 114, including but not limited to type FHS M8-32 or type FHS-M8-35 metric threaded studs available from PEM® Fastening Systems of Danboro, Pa.

Figure 5:
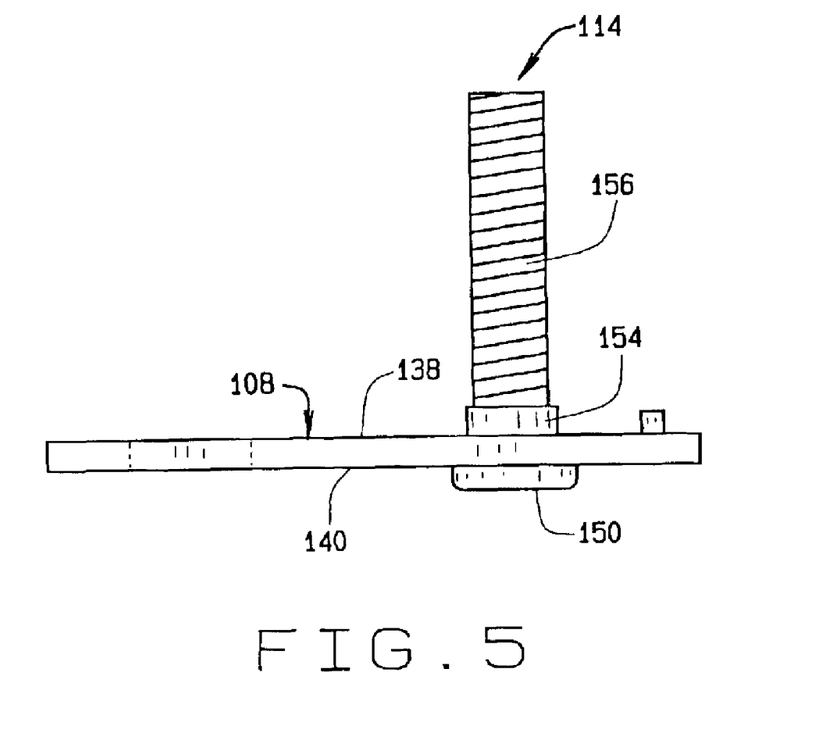
FIG. 5 is an elevational view of the terminal stud shown in FIG. 4 attached to the bus bar shown in FIGS. 2 and 3.

FIG. 5 is an elevational view of terminal stud 114 attached to bus bar 108. Terminal shoulder portion 154 is extended through fuse terminal bore 144 (shown in FIG. 2) and coarse knurl 152 (shown in FIG. 4) is press fit into fuse terminal bore 144 such that terminal 114 is coupled with an interference fit to bus bar 108. Terminal head portion 150 is in contact with bus bar lower surface 140, and terminal threaded stud portion 156 extends above bus bar upper surface 138 so that fuse 116 (shown in FIG. 1) may be coupled to terminal stud 114 in a manner described below.

Figure 6:
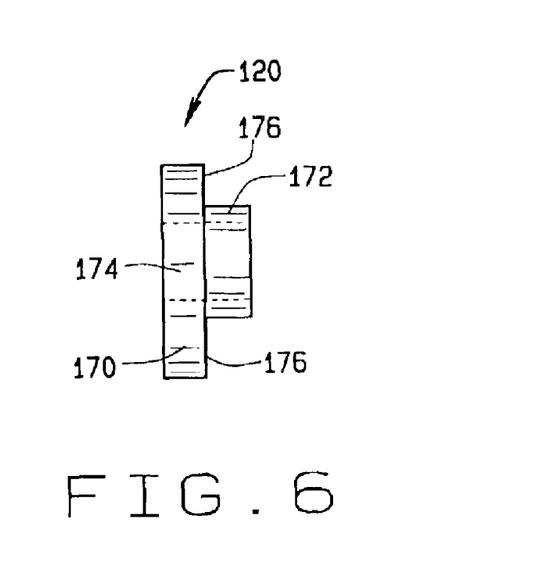
FIG. 6 is an elevational view of an insulative spacer element for the assembly shown in FIG. 1.

FIG. 6 is an elevational view of insulative spacer element 120 (also shown in FIG. 1) used to isolate auxiliary power cable 118 (shown in FIG. 1) from terminal 114 and to prevent short circuiting of fuse 116 (shown in FIG. 1) in use. Thus, relatively expensive insulating nuts to isolate terminal 114 need not be employed.

Spacer element 120 is fabricated from a nonconductive, or insulative, material according to known methods and techniques. Fabrication material for spacer element 120 is selected to adequately resist compression forces when assembly 100 (shown in FIG. 1) is assembled and to capably withstand heat generated from high amperage current flowing through fuse 116 (shown in FIG. 1) from battery 104 (shown in FIG. 1) in normal operation. In an exemplary embodiment, spacer element 120 is fabricated from an electrical grade phenolic plastic material, although it is appreciated that other materials may be employed to fabricate spacer element 120. In a further embodiment, spacer element 120 includes interlocking features for engagement with flange nut 122, thus creating a nested spacer element/flange nut arrangement that eases assembly of battery fuse bus bar assembly 100 (shown in FIG. 1) and reduces error in assembling battery bus bar assembly 100.

Spacer element 120 includes an annular collar portion 170 and a cylindrical neck portion 172 extending therefrom. A bore 174 (shown in phantom in FIG. 6) extends through and is substantially centered within collar portion 170 and neck portion 172. Bore 174 is dimensioned to be slightly larger than an outer dimension of terminal threaded portion 156 (shown in FIGS. 4 and 5) to provide a clearance for terminal threaded portion 156 when spacer element 120 is inserted over terminal 114 (as shown in FIG. 1). Collar portion 170 has a larger outer diameter than neck portion 172 such that collar portion 172 forms a bearing surface 176 adjacent neck portion 172. Neck portion 172 is dimensioned for insertion into one end of fuse 116 (shown in FIG. 1), and when neck portion 172 is inserted into fuse 116, spacer element neck portion isolates fuse 116 from terminal stud 114, while collar portion 170 isolates auxiliary cable 118 (shown in FIG. 1) from terminal stud 114 and maintains electrical connection between fuse 116 and auxiliary cable 118. Because of the isolation provided by spacer element 120, current may not flow directly from terminal stud 114 to auxiliary power cable 118, but rather must pass through fuse 116 before reaching auxiliary power cable 118.

Figure 7:
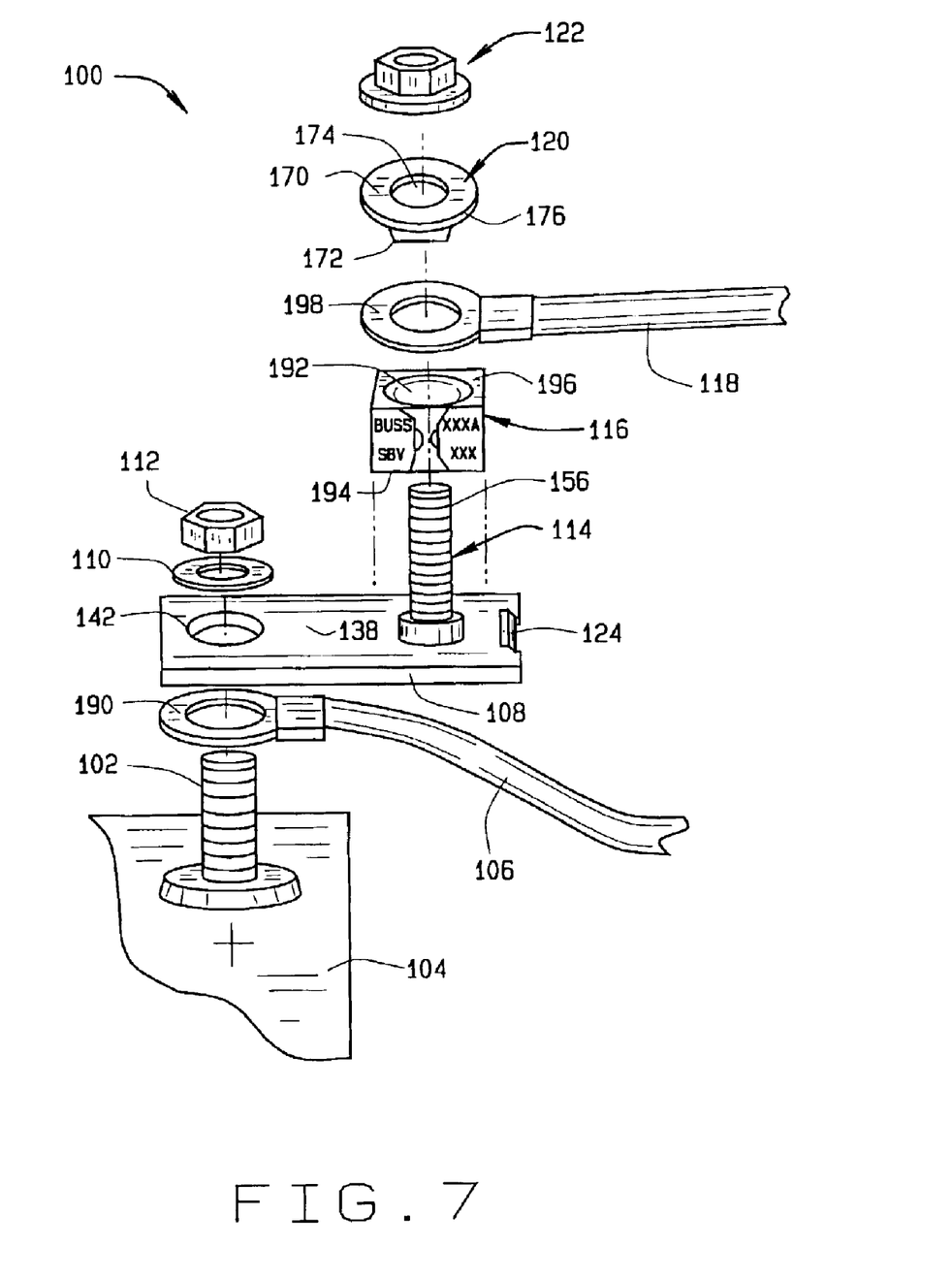
FIG. 7 is an exploded view of the assembly shown in FIG. 1.

FIG. 7 is an exploded view of battery bus bar fuse assembly 100 and whereby an exemplary method of assembling assembly 100 is explained.

A ring collar 190 of starter cable 106 is inserted over positive threaded post terminal 102 of battery 104. Bus bar 108, with attached terminal 114 is then attached to battery terminal 102 by inserting positive battery terminal 102 through battery terminal bore 142 in bus bar 108. Once battery terminal 102 is received in battery terminal bore 142, bus bar 108 is attached to battery terminal 102 with washer 110 and nut 112 with threaded engagement as shown in FIG. 1.

Once bus bar 108 is attached to battery terminal 102, fuse 116 is inserted over terminal stud 114 and stud 114 is passed through a central opening 192 in fuse 116 until a lower bearing surface 194 of fuse 116 contacts bus bar surface 138 and fuse 116 is seated upon bus bar 108 adjacent anti-rotation stop 124. A collar ring 198 of auxiliary power cable 118 is then inserted over terminal 114 and in contact with an upper bearing surface 196 of fuse 116. Spacer element 120 is then inserted over terminal 114 such that threaded portion 156 extends through spacer element central bore 174 and spacer element neck section 172 is extended through auxiliary cable ring collar 198 and into a portion of opening 192 extending through fuse 116. Spacer element bearing surface 176 contacts an upper surface of auxiliary cable ring collar 198, and then flange nut 122 is attached to threaded portion 156 of terminal stud 114 and is tightened to securely fasten spacer element 120, auxiliary cable ring collar 198, fuse 116, and bus bar 108.

In different embodiments, and depending upon the characteristics of terminal stud 114, flange nut 122 is an FH-HVBF-FLN ¼–20 Hex Flange Lock Nut, or an FH-HVBF-FLN-M8 Metric Hex Flange Lock Nut commercially available from, for example, Infasco Nut of Mississaugua Ontario, Canada. Once flange nut 122 is tightened, assembly 100 as depicted in FIG. 1 is completed.

When assembled, current flows from battery terminal 102, through bus bar 108 to fuse bearing surface 194, through fuse 116 to fuse bearing surface 196 and to ring collar 198 through auxiliary cable 118 to auxiliary circuits or components. Spacer element 120 ensures current flow through fuse 116 to protect auxiliary cable 118 and associated components and circuits from damaging fault currents.

Assembly 100 thereby provides a compact and localized fused connection to threaded post terminal 102 of battery 104 for protection of auxiliary circuits and components. Alternative fuse arrangements elsewhere in the vehicle may therefore be avoided while providing clear and direct access to fuse 116 and connection of auxiliary power cables.

Figure 8:
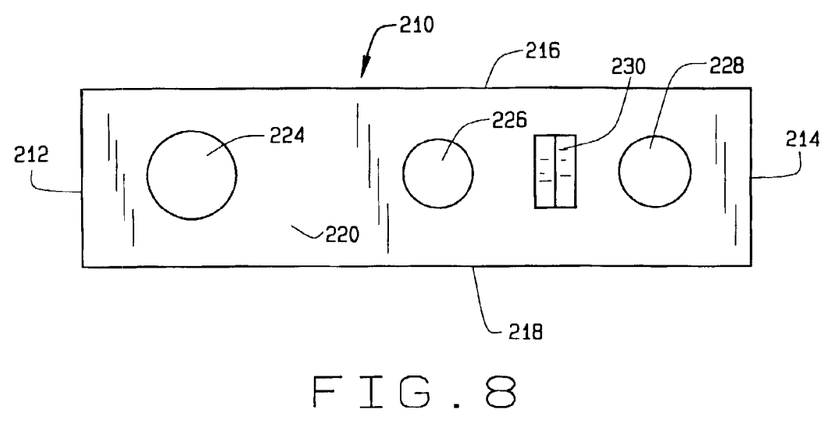
FIG. 8 is a top plan view of a second embodiment of a bus bar for the assembly shown in FIGS. 1 and 7.
Figure 9:
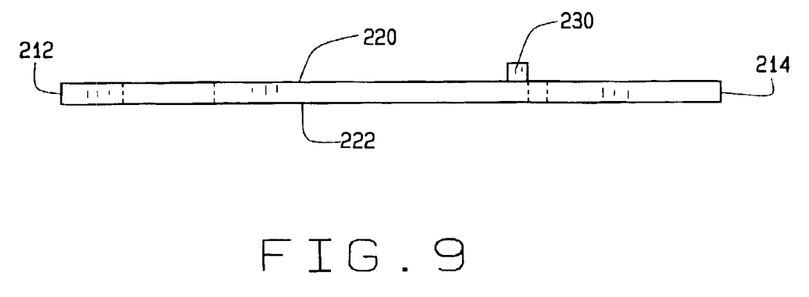
FIG. 9 is a side elevational view of the bus bar shown in FIG. 8.

FIGS. 8 and 9 are a top plan view and side elevational view, respectively, of a second embodiment of a bus bar 210 for use in assembly 100 (shown in FIGS. 1 and 7) in lieu of bus bar 108 as described above. As will be seen, bus bar 210 is adapted for use with more than one fuse 116 and therefore may provide more than one fused connection to an auxiliary cable, such as cable 118 (shown in FIGS. 1 and 7).

Bus bar 210, like bus bar 108, is fabricated from a conductive material, such as copper, according to known methods and techniques, including but not limited to stamping and die casting operations. In a further embodiment, bus bar 210 is plated with tin or another known material to resist or retard corrosion of bus bar 210.

Bus bar 210 is formed into a generally rectangular plate in an exemplary embodiment and includes opposite end edges 212, 214, elongated lateral edges 216, 218 extending between end edges 212, 214, and generally flat planar surfaces 220, 222 extending opposite one another and between edges 212, 214, 216 and 218. In one embodiment, bus bar 210 has an overall length of about 75.0 mm, a width of about 20.0 mm, and a thickness of about 2.36 mm, although it is appreciated that greater or lesser dimensions of bus bar 210 may be employed in alternative embodiments. It is further appreciated that bus bar 210 may be formed into a variety of shapes in lieu of the above-described rectangular plate configuration.

A battery terminal bore 224 extends through bus bar 210 at a distance from bus bar edge 212 and is substantially centered between bus bar lateral edges 216, 218 at one end of bus bar 108. Battery terminal bore 224 is dimensioned for insertion over battery threaded post terminal 102 (shown in FIGS. 1 and 7). A pair of fuse terminal bores 226, 228 extend through bus bar 210 and are substantially centered between bus bar lateral edges 216, and 218 on an end of bus bar 210 opposite of battery terminal bore 224. Fuse terminal bores 226, 228 are dimensioned to receive a respective terminal stud 114 (shown in FIGS. 1, 4, 5 and 7) with an interference fit. In a particular embodiment, battery terminal bore 224 has an inner diameter of about 10.3 mm, fuse terminal bores 226, 228 have an inner diameter of about 8.0 mm, and bores 224 and 226 are located from one another at a center-to-center distance of about 28.0 mm. It is appreciated, however that greater or lesser diameter values for bores 224, 226, 228 may be employed in alternative embodiments.

An anti-rotation stop 230 projects from bus bar surface 220 between fuse terminal bores 226, and 228 to maintain fuse 116 (shown in FIGS. 1 and 7) in proper position relative to bus bar 108. In one embodiment, anti-rotation stop 230 is cut or sheared from bus bar 210 and is bent upwardly at approximately a 90° angle with respect to bus surface 220. As such anti-rotation stop 230 projects upwardly from surface 220 for a distance of about 2.36 mm and extends for a length of about 8.0 mm measured in a direction substantially parallel to bus bar end edge 214. It is appreciated, however that greater or lesser dimensions for anti-rotation stop 230 may be employed in alternative embodiments. It is further appreciated that stop 230 may be located elsewhere on bus bar 210 while serving the same purpose of preventing relative movement of bus bar 210 and fuses 116 in use. It is further appreciated that more than one anti-rotation stop may be employed in bus bar 210.

Figure 10:
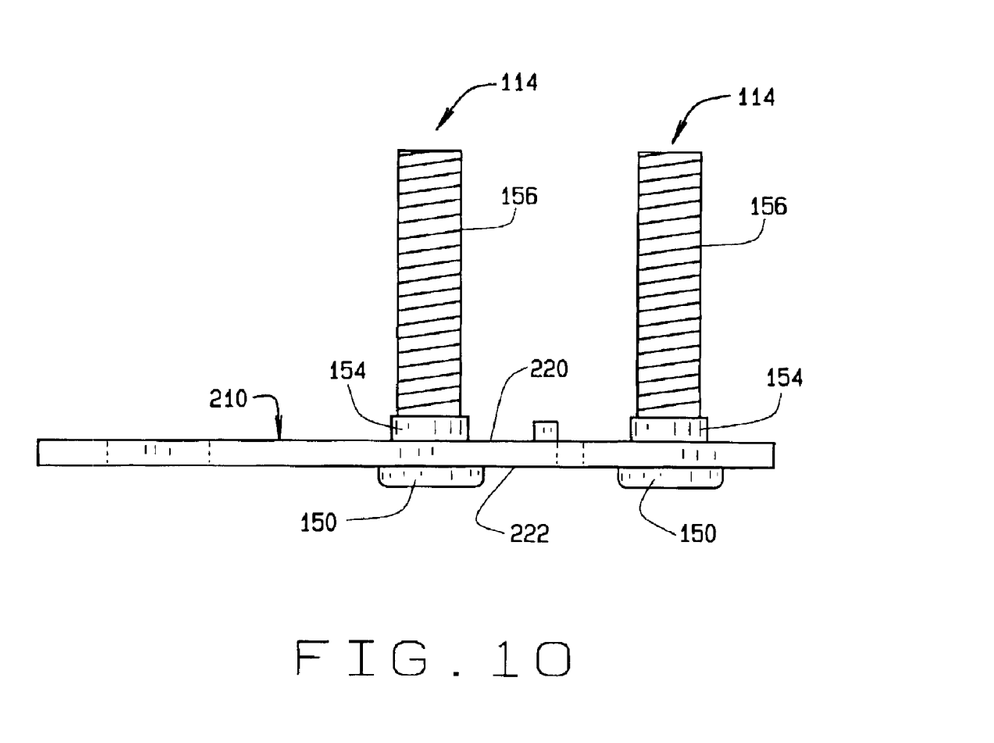
FIG. 10 is a side elevational view of the bus bar shown in FIGS. 8 and 9 with terminal studs attached.

FIG. 10 is a side elevational view of bus bar 210 with a terminal stud 214 attached to each fuse terminal bore 226, 228 (shown in FIG. 8). Terminal shoulder portions 154 are extended through fuse terminal bores 226, 228 and coarse knurl 152 (shown in FIG. 4) is press fit into fuse terminal bores 226, 228 such that each terminal 114 is coupled with an interference fit to bus bar 210. Terminal head portions 150 are in contact with bus bar lower surface 222, and terminal threaded stud portions 156 extends above bus bar upper surface 220 so that fuses 116 (shown in FIGS. 1 and 17) may be coupled to each respective terminal stud 114 as described above in relation to FIG. 7. When each fuse 116 is coupled to an auxiliary cable, each cable may be separately protected from fault currents with bus bar 210.

It should now be apparent that in further alternative embodiments, a bus bar may be provided with three or more fuse terminal bores to provide three of more fused connections for auxiliary circuits or applications.

While the invention has been described in terms of various specific embodiments, those skilled in the art will recognize that the invention can be practiced with modification within the spirit and scope of the claims.

What is claimed is:

1. A battery fuse assembly for a storage battery having a threaded post terminal, said fuse assembly comprising:
   a bus bar comprising a planar surface and a first opening extending therethrough for receiving the threaded post terminal;
   at least one threaded terminal stud extending from said planar surface and distanced from said first opening; and
   a battery fuse coupled to said planar surface over said threaded terminal stud.

2. A battery fuse assembly in accordance with claim 1 further comprising an auxiliary power supply cable in electrical connection with said fuse.

3. A battery fuse assembly in accordance with claim 2 further comprising an insulative spacer element extending between said threaded terminal stud and said fuse.

4. A battery fuse assembly in accordance with claim 3 wherein said spacer element comprises a bearing contact surface, said bearing contact surface engaged to said auxiliary power supply cable.

5. A battery fuse assembly in accordance with claim 1 wherein said battery fuse is coupled to said first surface with a flange nut engaged to said threaded terminal post.

6. A battery fuse assembly in accordance with claim 1, said bus bar comprising a projection extending from said planar surface, said projection located adjacent said fuse.

7. A battery fuse assembly for a storage battery having a threaded post terminal, said fuse assembly comprising:
   a bus bar comprising an end edge and a first surface extending from said end edge, said first surface comprising an opening therethrough, said opening distanced from said end edge, said opening dimensioned for receiving the threaded post terminal of the battery;
   at least one threaded terminal stud extending from said first surface at a distance from said first opening; and
   a battery fuse engaged to said first surface over said threaded terminal stud.

8. A battery fuse assembly in accordance with claim 7, said bus bar comprising a projection extending from said first surface, said projection located adjacent said fuse.

9. A battery fuse assembly in accordance with claim 7 further comprising an insulative spacer element extending between said threaded terminal stud and said fuse.

10. A battery fuse assembly in accordance with claim 9 further comprising an auxiliary power supply cable in electrical connection with said fuse, said cable contacting said spacer element.

11. A battery fuse assembly in accordance with claim 10 further comprising an flange nut engaged to said threaded terminal stud, thereby coupling said cable to said fuse.

12. A battery fuse assembly comprising:
   a battery comprising a threaded terminal post;
   a bus bar comprising a first opening and a second opening therethrough, said threaded terminal post extending through said first opening,
   at least one threaded terminal stud extending through said second opening of said bus bar; and
   a battery fuse engaged to said bus bar over said threaded terminal stud.

13. A battery fuse assembly in accordance with claim 12 further comprising an auxiliary power supply cable electrically connected to said fuse.

14. A battery fuse assembly in accordance with claim 13 further comprising an insulative spacer element inserted over said fuse terminal stud, said spacer element isolating said cable from said fuse terminal stud.

15. A battery fuse in accordance with claim 14 wherein said spacer element includes a collar portion and a neck portion, said neck portion isolating said fuse from said fuse terminal stud.

16. A battery fuse assembly comprising:
   a battery comprising a threaded terminal post;
   a starter cable in electrical connection with said terminal post,
   a conductive bus bar having a first opening and a second opening therethrough, said threaded terminal post extending through said first opening;
   a nut in threaded engagement with said battery terminal post, said nut coupling said bus bar and said starter cable to said battery terminal post;
   a threaded terminal stud extending from said bus bar through said second opening;
   a battery fuse comprising opposite bearing surfaces and an opening therebetween, said terminal stud extending through said opening in said fuse, one of said bearing surfaces contacting said bus bar;
   an auxiliary power supply cable contacting the other of said bearing surfaces of said fuse;
   an inulsative spacer element configured to isolate said auxiliary power supply cable and said fuse from said threaded terminal stud; and
   a flange nut coupled to said threaded terminal stud with threaded engagement, said flange nut contacting said spacer element.

17. A battery fuse assembly in accordance with claim 16 wherein said threaded terminal stud comprises a shoulder stud.

18. A battery fuse assembly in accordance with claim 16 wherein said spacer element comprises a collar portion and a neck portion, a bore extending through said collar portion and said neck portion.

19. A battery fuse assembly in accordance with claim 16 wherein said collar portion comprises a bearing surface, said bearing surface in contact with said cable.

20. A battery fuse assembly in accordance with claim 16 wherein said bus bar comprises a third opening dimensioned for attachment of a second threaded terminal stud.

* * * * *